L. W. Fifield,
Knitting-Mach. Needle.

No. 61,413.      Patented Jan. 22, 1867.

Witnesses:
Samuel N. Piper
George H. Andrews

Inventor:
Levi W. Fifield
by his attorney
R. H. Eddy

United States Patent Office.

LEVI W. FIFIELD, OF MELROSE, MASSACHUSETTS.

Letters Patent No. 61,413, dated January 22, 1867.

IMPROVEMENT IN KNITTING-MACHINE NEEDLE.

*The Schedule referred to in these Letters Patent and making part of the same.*

TO ALL PERSONS TO WHOM THESE PRESENTS SHALL COME:

Be it known that I, LEVI W. FIFIELD, of Melrose, of the county of Middlesex, and State of Massachusetts, have made a new and useful invention having reference to the Needles of Knitting or Hosiery Looms or Machines; and I do hereby declare the same to be fully described in the following specification, and represented in the accompanying drawings, of which—

Figure 1:
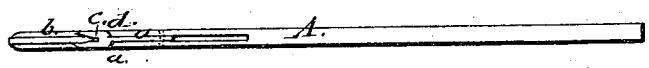

Figure 1 is a top view.

Figure 2:

Figure 2, a side elevation; and

Figure 3:

Figure 3, a longitudinal section of a hook and latch knitting-needle provided with my improvement.

In carrying out my invention I make the turning latch or closer, $a$, of the needle furcated, to receive the point of the hook $b$ of the shank A, the same being as shown at $c$, in fig. 1. I also form the latch with one or two shoulders, $d\ d$, to project from it laterally for the purpose of supporting the latch on the shank, when the latch is formed to receive the point of the hook. And, instead of making in the revolving or turning latch a round or cylindrical hole for reception of the supporting pin $e$, I form therein an elongated hole or slot, as shown at $f$, in fig. 3, such hole being to enable the furcated latch to slide forward up to and back from the hook. The furcated latch, with reference to the ordinary latch, serves to more effectually cover the sides of the point of the hook, and prevent the loop from catching on the point. Being supported by its shoulder or shoulders upon the shank of the needle, the latch is not liable to injure or wear the hook at its point; and, besides, by dropping to a level with the point, instead of resting on or standing over it as the ordinary latch does when thrown forward, it effects a saving in the height to which the stitch is to be raised. The slot in the latch or closer, by allowing the closer to move back and forth longitudinally, as well as to revolve on its pin $e$, enables a shorter closer to be employed, thus rendering the closer more durable, and easing the strain on the yarn.

I do not claim as my invention a hooked needle, provided with a turning latch or closer; nor do I claim a sliding closer, as provided with slots to receive pins, which go through it and the shank of the needle, and allow the closer to simply slide lengthwise, my latch or closer being a revolving one; but what I do claim as an improvement thereon is as follows:

I claim the closer or latch as made furcated and with one or more shoulders, $d$, arranged with respect to the forks as and for the purpose set forth.

I also claim the pivoted closer or latch, as made with the slot $f$, to enable it not only to turn upon but slide on its pin $e$, as set forth.

LEVI W. FIFIELD.

Witnesses:
R. H. EDDY,
L. MILLER.